(12) United States Patent
Uehara (10) Patent No.: US 10,007,226 B2
(45) Date of Patent: Jun. 26, 2018

(54) IMAGE FORMING APPARATUS

(71) Applicant: KYOCERA Document Solutions Inc., Osaka (JP)

(72) Inventor: Masakazu Uehara, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 7 days.

(21) Appl. No.: 15/677,588

(22) Filed: Aug. 15, 2017

(65) Prior Publication Data

US 2018/0063346 A1    Mar. 1, 2018

(30) Foreign Application Priority Data

Aug. 31, 2016    (JP) .............................. 2016-168946

(51) Int. Cl.
    *G03G 21/16*      (2006.01)
    *H04N 1/00*      (2006.01)
    *G03G 15/00*      (2006.01)

(52) U.S. Cl.
    CPC ..... *G03G 21/1604* (2013.01); *G03G 21/1666* (2013.01); *H04N 1/00519* (2013.01); *G03G 15/5016* (2013.01); *H04N 1/00557* (2013.01)

(58) Field of Classification Search
    CPC ....................... G03G 21/1604; G03G 21/1661
    See application file for complete search history.

(56) References Cited

U.S. PATENT DOCUMENTS

| | | | | |
|---|---|---|---|---|
| 8,009,331 | B2 * | 8/2011 | Suzuki | G03G 15/6552 358/296 |
| 2006/0288331 | A1 * | 12/2006 | Asakawa | G03G 15/5016 717/120 |

FOREIGN PATENT DOCUMENTS

JP      H10-313373 A      11/1998

* cited by examiner

*Primary Examiner* — Erika J Villaluna
(74) *Attorney, Agent, or Firm* — Studebaker & Brackett PC (57) ABSTRACT

An image forming apparatus includes an image forming section, a casing, a housing, an operation panel, and a speaker section. The image forming section forms an image on a sheet of paper. The casing accommodates the image forming section. The housing is supported on an upper surface of the casing. The operation section is operated by a user. The speaker section provides sound information to surroundings. The housing has one side on which the user operates the operation panel and another side opposite to the one side. The speaker section is accommodated at a location closer to the one side than the rear in an interior of the housing.

10 Claims, 7 Drawing Sheets

IMAGE FORMING APPARATUS

INCORPORATION BY REFERENCE

The present application claims priority under 35 U.S.C. § 119 to Japanese Patent Application No. 2016-168946, filed on Aug. 31, 2016. The contents of this application are incorporated herein by reference in their entirety.

BACKGROUND

The present disclosure relates to image forming apparatuses.

Some image forming apparatus include a main body, an in-body discharge section, a scanner, and a speaker. The main body has a rectangular box shape. The scanner is supported by the main body from below with the in-body discharge section therebetween. The in-body discharge section includes a joint housing.

The joint housing has a U-shape when viewed in plan. The joint housing is disposed along edges of the upper surface of the main body. An in-body space is defined among the main body, the scanner, and the joint housing. Paper on which an image has been formed is ejected into the in-body space. The speaker may be disposed within the joint housing in the image forming apparatus. The speaker faces the in-body space. In the above configuration, sound emitted by the speaker is resonated in the in-body space so that the sound emitted by the speaker is clearly audible to the user.

SUMMARY

An image forming apparatus according to the present disclosure includes an image forming section, a casing, a housing, an operation section, and a speaker section. The image forming section forms an image on a recording medium. The casing accommodates the image forming section. The housing is supported on an upper surface of the casing. The operation section is operated by a user. The speaker section provides sound information to surroundings. The housing has one side on which the user operates the operation section and another side opposite to the one side. The speaker section is accommodated at a location closer to the one side than the other side in an interior of the housing.

DETAILED DESCRIPTION

The following describes an embodiment of the present disclosure with reference to the accompanying drawings. However, the present disclosure is not limited to the following embodiment. Elements that are the same or equivalent are marked using the same reference signs in the drawings and explanation thereof is not repeated.

Figure 1:
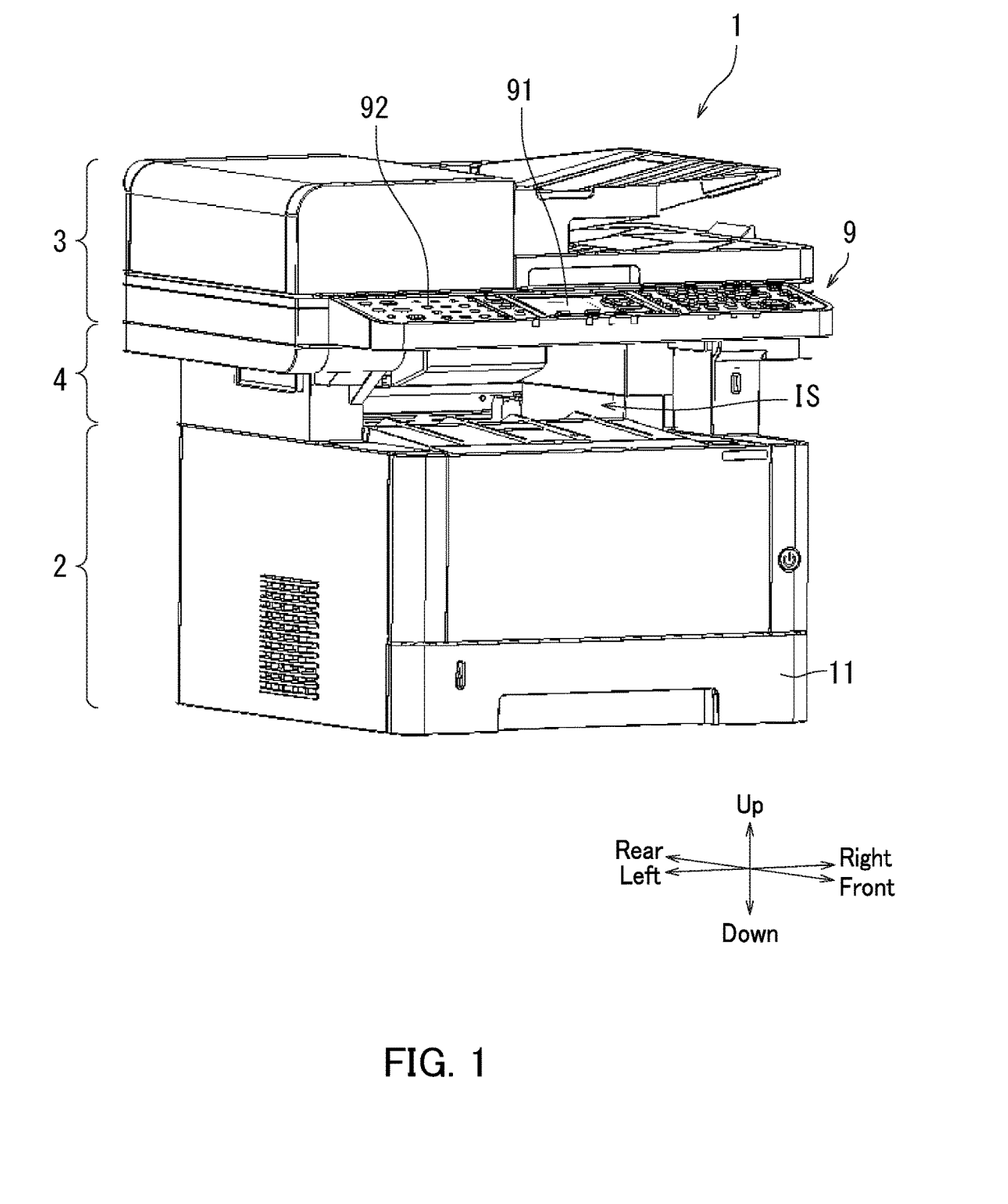
FIG. 1 is a perspective view illustrating an image forming apparatus according to an embodiment of the present disclosure.

A configuration of an image foil ling apparatus 1 according to the present embodiment will be described with reference to FIG. 1. FIG. 1 is a perspective view illustrating the image forming apparatus 1 according to the present embodiment. As illustrated in FIG. 1, the image forming apparatus 1 in the present embodiment is a multifunction peripheral.

Note that the image forming apparatus 1 may be a copier, a printer, or a facsimile machine. The multifunction peripheral has for example at least two functions of a copy function, a printing function, and a facsimile function.

The image forming apparatus 1 includes a casing 2, an image reading section 3, a housing 4, an operation panel 9, and an accommodation tray 11. A direction in which the operation panel 9 faces in FIG. 1 is determined as a front to define a front-rear direction. Also, the left hand side of the image forming apparatus 1 is determined as left to define a left-right direction. A direction perpendicular to the front-rear direction and the left-right direction is defined as an up-down direction.

The operation panel 9 is an example of an operation section in the present disclosure. The operation panel 9 includes a display section 91 and an input section 92. The display section 91 includes a display. The display section 91 displays various setting screens of the image forming apparatus 1. The input section 92 includes hard keys. The input section 92 outputs operation signals according to user operation.

The casing 2 has a rectangular box shape. The casing 2 supports the housing 4 from below. Specifically, the housing 4 is disposed on the upper surface of the casing 2. The upper surface of the casing 2 and the lower surface of the housing 4 are fixed together for example with a fixing member. The fixing member is for example a screw or a vis.

The housing 4 supports the image reading section 3 from below. The image reading section 3 is disposed on the upper surface of the housing 4. The housing 4 has a substantially U-shape open on the front side when viewed in plan. The housing 4 is disposed along edges of the upper surface of the casing 2. The upper surface of the housing 4 and the lower surface of the image reading section 3 are fixed together for example with a fixing member.

The housing 4 has a front side (one side) on which a user operates the operation panel 9 and a rear side (another side) opposite to the front side. The housing 4 has a front end portion F located on the front side thereof and a rear end portion B located on the rear side thereof (see FIG. 2).

The image reading section 3 reads an image of an original document and generates image data. The image reading section 3 is for example a scanner. An in-body space IS is defined among the casing 2, the image reading section 3, and the housing 4. The accommodation tray 11 accommodates paper S.

Figure 2:
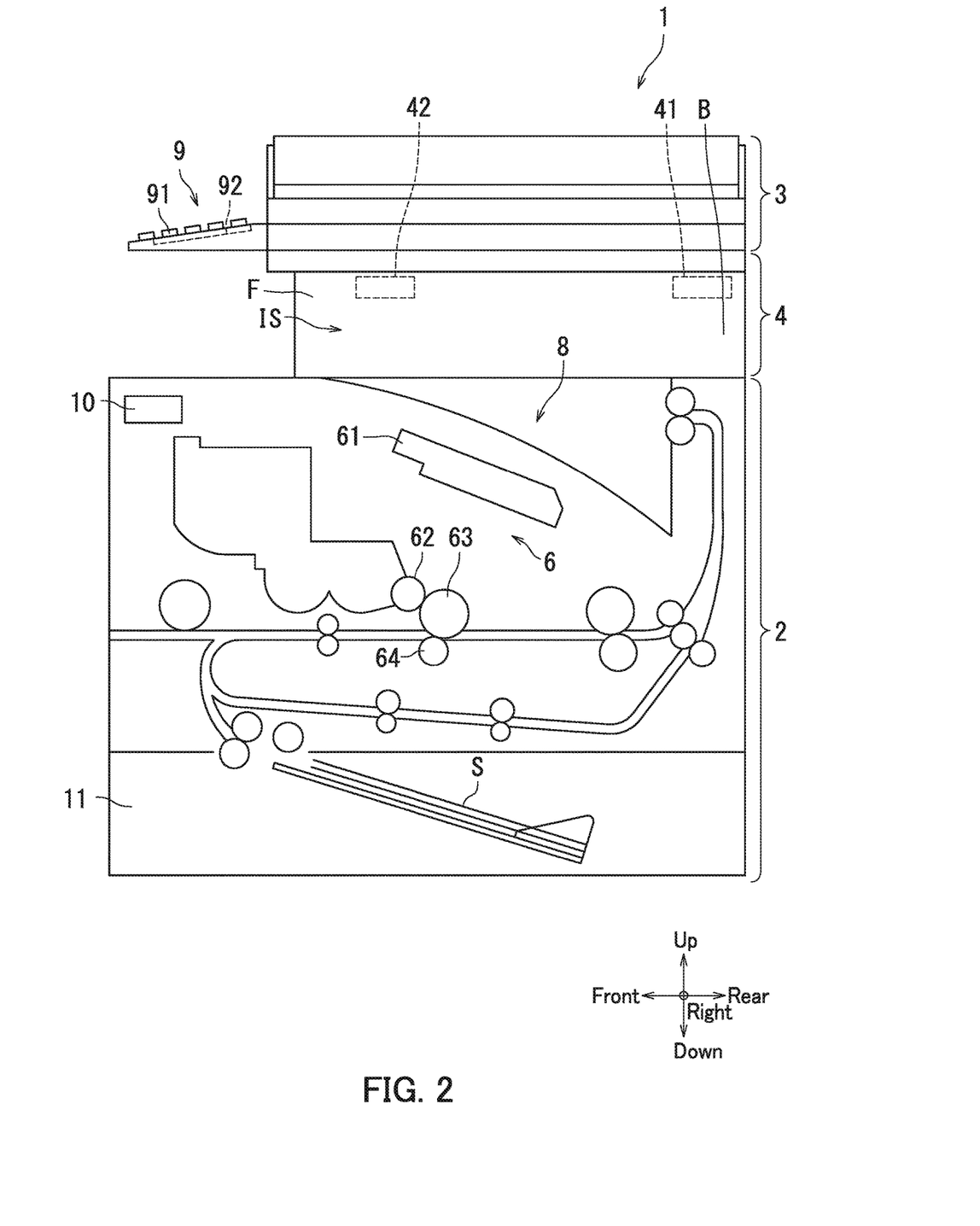
FIG. 2 illustrates a configuration of the image forming apparatus illustrated in FIG. 1.

The configuration of the image forming apparatus 1 will be further described with reference to FIG. 2. FIG. 2 illustrates the configuration of the image forming apparatus 1. As illustrated in FIG. 2, the image forming apparatus 1 further includes an image forming section 6, an exit tray 8, a controller 10, a fax board 41, and a speaker section 42.

The image forming section 6 forms an image on a sheet of paper S. The image forming section 6 includes an exposure device 61, an developing device 62, a photosensitive drum 63, and a transfer device 64.

The upper surface of the casing 2 forms the exit tray 8. In the image forming apparatus 1 of the present embodiment, a sheet of paper S on which an image has been formed is ejected onto the exit tray 8 from the rear of the in-body space IS.

The paper S is an example of a recording medium in the present disclosure. The paper S refers to for example plain paper, copy paper, recycled paper, thin paper, thick paper, glossy paper, or paper for an overhead projector (OHP).

The controller 10 controls respective elements of the image forming apparatus 1. Specifically, the controller 10 executes pre-stored computer programs for example to control the image reading section 3, the image forming section 6, the operation panel 9, the fax board 41, and the speaker section 42. The controller 10 is for example constituted by a central processing unit (CPU).

The controller 10 controls the fax board 41 for example to perform communication with an external device via a communication network when the facsimile function of the image forming apparatus 1 is used. The controller 10 controls the fax board 41 to transmit image data to an external device when a transmission function included in the facsimile function is executed. The controller 10 also controls the fax board 41 to receive image data from an external device when a receiving function included in the facsimile function is executed.

Furthermore, the controller 10 controls the speaker section 42 to provide sound information to surroundings. The controller 10 controls the speaker section 42 to emit sound indicating for example that the fax board 41 is performing communication with an external device during the facsimile function being used. The controller 10 controls the speaker section 42 to emit sounds different between when the fax board 41 transmits image data to an external device and when the fax board 41 receives image data from an external device.

Figure 3:
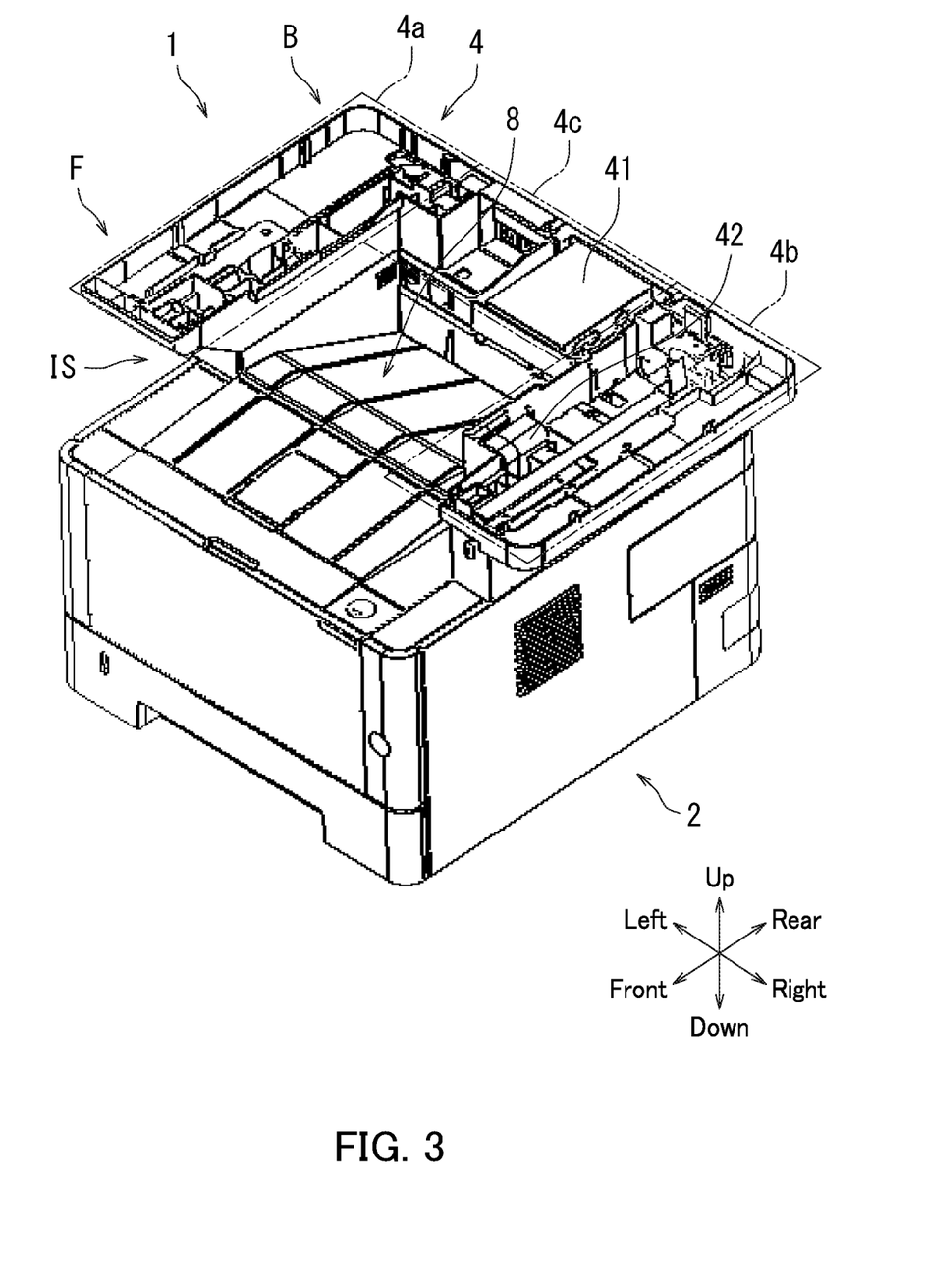
FIG. 3 is a perspective view illustrating the image forming apparatus in FIG. 1 from which an image reading section is removed.

The interior of the housing 4 will be described with reference to FIG. 3. FIG. 3 illustrates the image forming apparatus 1 from which the image reading section 3 is removed. As illustrated in FIG. 3, the housing 4 is hollow.

The internal space of the housing 4 is divided into for example a first area 4a, a second area 4b, and a third area 4c. The first area 4a extends across a specific width along the left edge of the casing 2 frontward from the rear edge of the casing 2.

The second area 4b extends across a specific width along the right edge of the casing 2 frontward from the rear edge of the casing 2. The third area 4c extends across a specific width along the rear edge of the casing 2 between the first and second areas 4a and 4b.

The fax board 41 and the speaker section 42 are disposed in the interior of the housing 4. The fax board 41 is accommodated at a location closer to the rear end portion 9 than the front end portion F in the interior of the housing 4. The fax board 41 is disposed in the third area 4c of the housing 4. In the above configuration, a situation in which a connection cable connected to the fax board 41 is exposed at the front of the image forming apparatus 1 can be prevented. The connection cable is for example a telephone line.

The fax board 41 is capable of being attached to and detached from the housing 4. The fax board 41 is fixed to the housing 4 for example with a fixing member. In the above configuration, the fax board 41 can be easily removed from the housing 4 in a situation in which the facsimile function is to be removed from the image forming apparatus 1.

The speaker section 42 is accommodated at a location closer to the front than the rear of the housing 4 in the interior of the housing 4. Specifically, the speaker section 42 is accommodated at a location closer to the front end portion F than the rear end portion B. More specifically, the speaker section 42 is disposed close to the front end portion F in the second area 4b of the housing 4. In the above configuration, the speaker section 42 in the image forming apparatus 1 of the present embodiment is closer to the user than that disposed close to the rear end portion B. As a result, sound emitted from the speaker section 42 can be clearly audible to the user.

The speaker section 42 is accommodated in the housing 4 such as to be adjacent to the in-body space IS with a wall 4d of the housing 4 therebetween. In the above configuration, sound emitted from the speaker section 42 resonates in the in-body space IS. As a result, sound emitted from the speaker section 42 can be clearly audible to the user.

Furthermore, the paper S is ejected onto the exit tray 8 from the rear of the in-body space IS in the image forming apparatus 1 of the present embodiment. In the above configuration, sound emitted from the speaker section 42 toward the user is not obstructed by the paper S ejected into the in-body space IS. As a result, sound emitted from the speaker section 42 can be clearly audible to the user.

Figure 4:
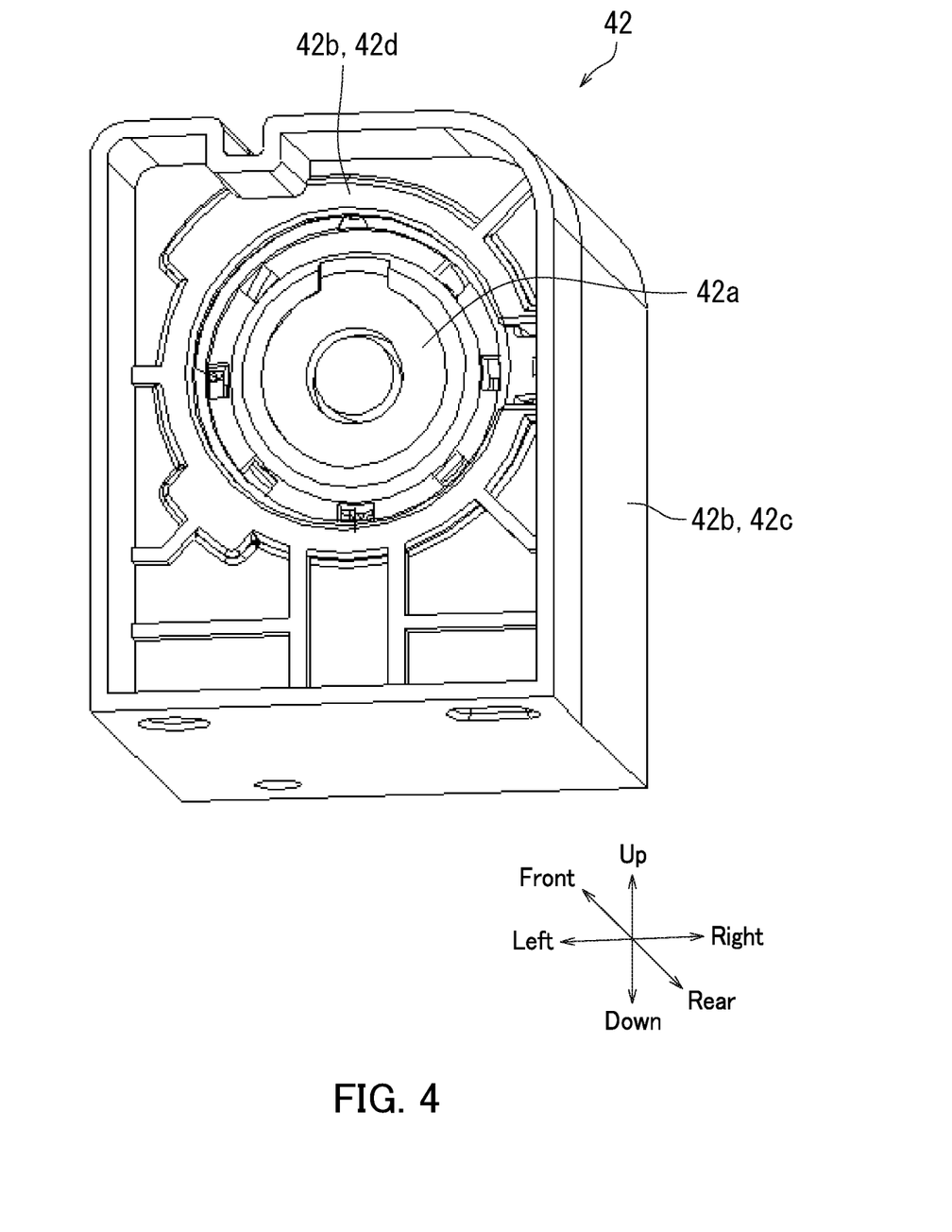
FIG. 4 is a perspective view illustrating the front of a speaker illustrated in FIG. 2.
Figure 5:
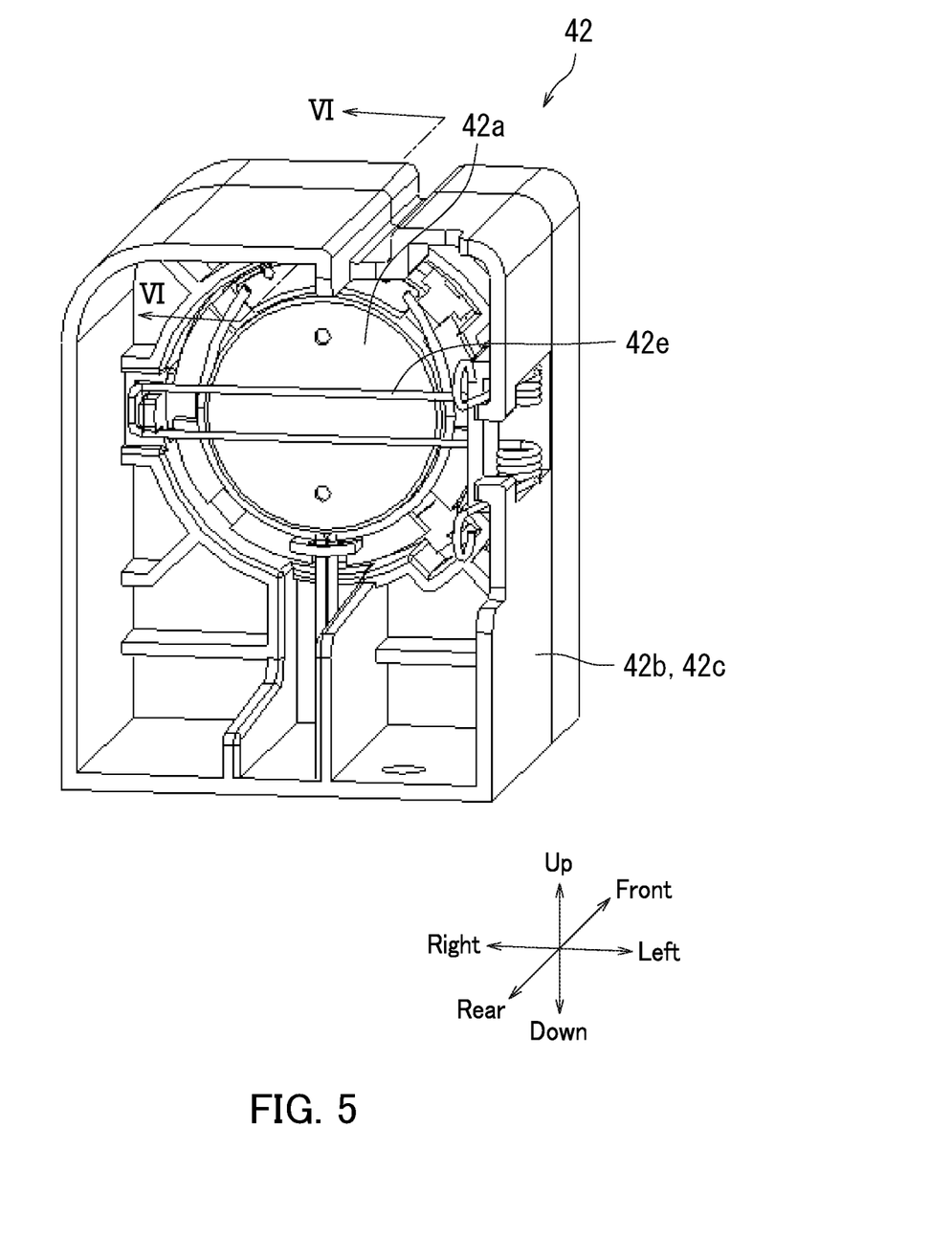
FIG. 5 is a perspective view illustrating the back of the speaker illustrated in FIG. 2.

A configuration of the speaker section 42 will be described with reference to FIGS. 4 and 5. FIG. 4 illustrates the front of the speaker section 42. Specifically, FIG. 4 is a perspective view illustrating the speaker section 42 as viewed leftwardly upward from the front. FIG. 5 illustrates the back of the speaker section 42. Specifically, FIG. 5 is a perspective view illustrating the speaker section 42 as viewed rightwardly downward from the back.

As illustrated in FIG. 4, the speaker section 42 includes a speaker 42a and a support 42b. The speaker 42a emits sound to the surroundings. Specifically, the speaker 42a emits sound to the surroundings for example based on electric signals input from the controller 10 which described with reference to FIG. 2. Note that the electric signals may be input from the fax board 41 which is described with reference to FIG. 2.

The support 42b includes a support main body 42c and a flange 42d. The support main body 42c has a tubular shape. The support main body 42c accommodates the speaker 42a therein.

The flange 42d protrudes from the inner surface of the support main body 42c. The flange 42d is in contact with the rim of the speaker 42a to support the speaker 42a.

As illustrated in FIG. 5, the speaker section 42 further includes a pressing member 42e. The pressing member 42e is supported by the support main body 42c. The pressing member 42e presses the speaker 42a against the flange 42d which is described with reference to FIG. 4. The pressing member 42e is for example a clip spring or a leaf spring. Use of the clip spring can reduce a contact area thereof with the speaker 42a more than use of the leaf spring.

Figure 6:
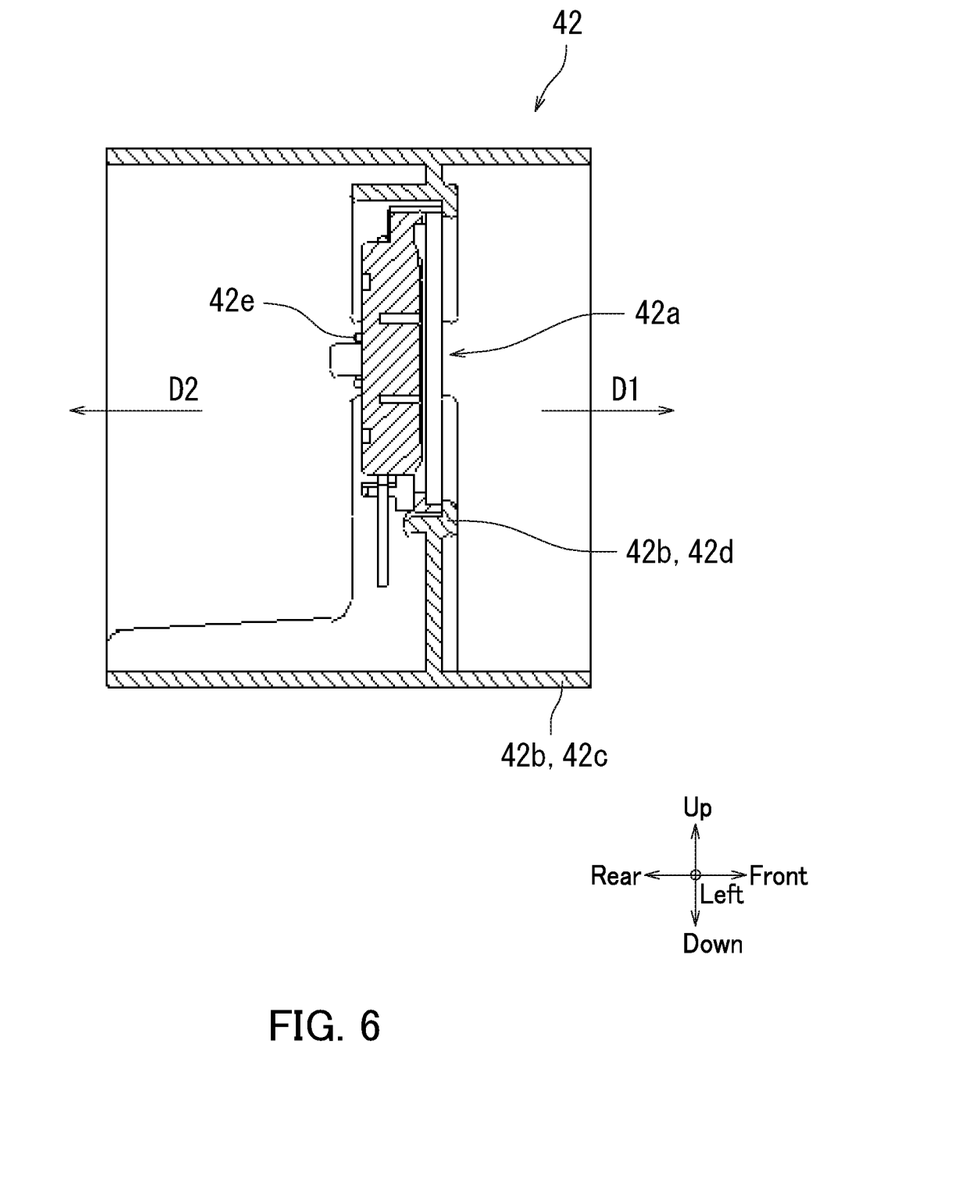
FIG. 6 is a cross-sectional view taken along the line VI-VI in FIG. 5.

The speaker section 42 will be further described with reference to FIG. 6. FIG. 6 is a cross-sectional view taken along the line VI-VI in FIG. 5. As illustrated in FIG. 6, the speaker 42a is accommodated in the interior of the support main body 42c. In the above configuration, cancellation between sound D1 emitted from the front of the speaker 42a and sound D2 emitted from the back of the speaker 42a can be inhibited. As a result, sound emitted from the speaker 42a can be increased.

Furthermore, the speaker 42a is pressed against the flange 42d by the pressing member 42e. In the above configuration, vibration of the speaker 42a after sound emission can be prevented. Reverberation of the speaker 42a can be accordingly inhibited, with a result that sound emitted from the speaker section 42 can be clearly audible to the user.

Figure 7:
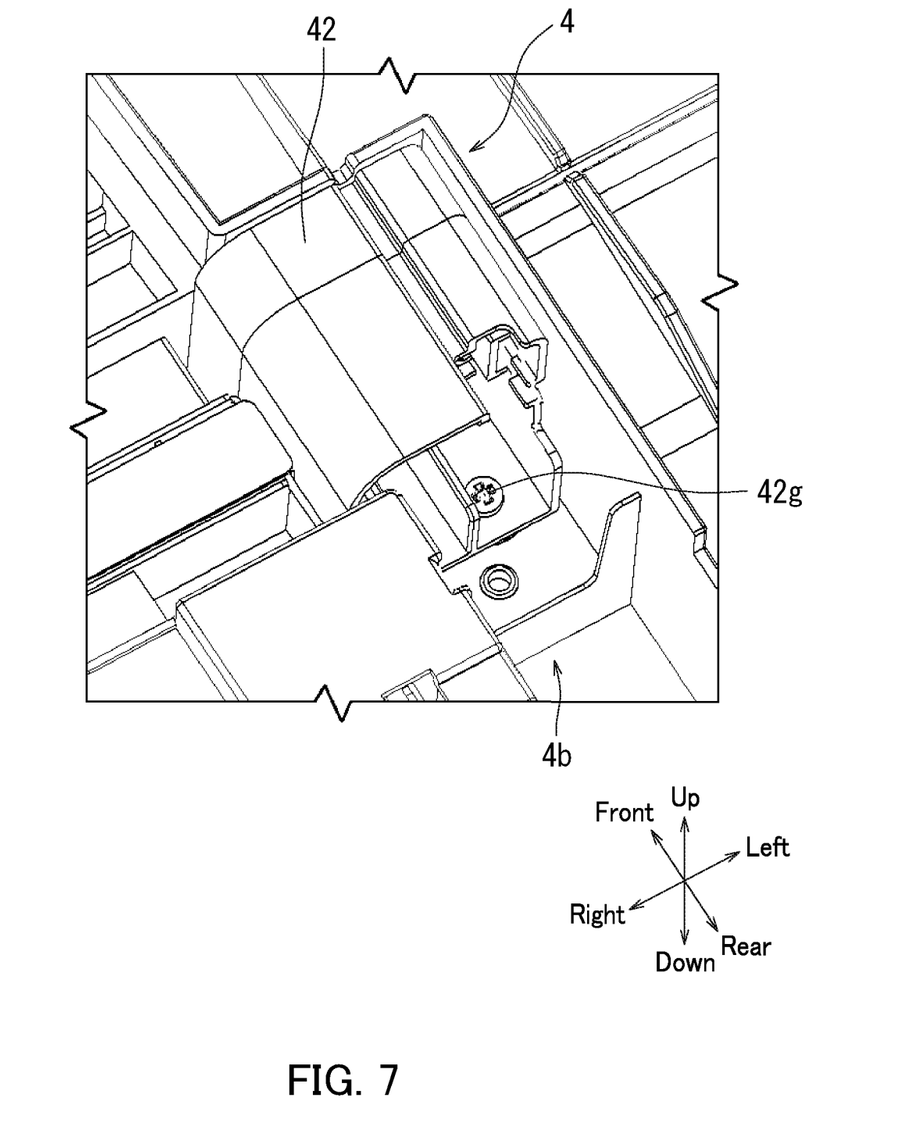
FIG. 7 is a perspective view illustrating a part of a second area in FIG. 3.

The following describes attachment and detachment of the speaker section 42 with reference to FIG. 7. FIG. 7 illustrates a part of the second area 4b of the housing 4. As illustrated in FIG. 7, the speaker section 42 is fixed to the housing 4 with a fixing member 42g such as a spring or a vis. In the above configuration, vibration of the speaker section 42 in sound emission can be inhibited.

The speaker section 42 is capable of being attached to and detached from the housing 4. In the above configuration, the speaker section 42 can be easily removed from the housing 4 in a situation in which the facsimile function is to be removed from the image forming apparatus 1.

The image forming apparatus 1 according to the embodiment of the present disclosure has been described so far with reference to FIGS. 1-7. However, the present disclosure is of course not limited to the above embodiment and can be implemented in various different forms without deviating from the general theme of the present disclosure.

For example, the speaker section 42 in the embodiment of the present disclosure is accommodated on the front side in the second area 4b of the housing 4, which however should not be taken to limit the present disclosure. It is only required that the speaker section 42 in the present disclosure is accommodated on the front side inside the housing 4. The speaker section 42 may be accommodated for example at a location closer to the front end portion F than the rear end portion B in the first area 4a of the housing 4.

Alternatively, the speaker section 42 may be accommodated for example in proximity to a front wall 4e located at the front of the housing 4 in the second area 4b. In the above configuration, the distance between the user and the speaker section 42 can be reduced, with a result that sound emitted from the speaker section 42 can be clearly audible to the user.

Furthermore, the controller 10 controls for example the speaker section 42 to emit sound indicating that the fax board 41 is performing communication with an external device during the facsimile function being used in the embodiment of the present disclosure, which however should not be taken to limit the present disclosure. It is only required that the controller 10 controls the speaker section 42 to emit sound indicating information useful to the user. For example, the controller 10 may control the speaker section 42, upon occurrence of a malfunction in the image forming apparatus 1, to emit sound indicating occurrence of the malfunction in the image forming apparatus 1.

The controller 10 may control the speaker section 42, once the accommodation tray 11 becomes empty, to emit sound indicating that no paper S is accommodated. In the above configuration, replenishment of the accommodation tray 11 with paper S is suggested to the user. The controller 10 may further control the speaker section 42, upon occurrence of a paper jam in the image forming apparatus 1, to emit sound indicating the paper jam. As a result, jam clearance is suggested to the user.

Note that the drawings schematically illustrate elements of configuration in order to facilitate understanding and properties of elements of configuration illustrated in the drawings, such as thickness and length thereof, may differ from actual properties thereof in order to facilitate preparation of the drawings. Furthermore, properties of elements of configuration described in the above embodiment, such as material properties, shapes, and dimensions, are merely examples and are not intended as specific limitations. Various alterations may be made so long as there is no substantial deviation from the advantages of the present disclosure.

What is claimed is:

1. An image forming apparatus comprising:
an image forming section configured to form an image on a recording medium;
a casing that accommodates the image forming section;
an exit tray serving as an upper surface of the casing;
a housing supported on the upper surface of the casing;
an image reading section that is supported on an upper surface of the housing and that reads an original document;
an operation section that is operated by a user; and
a speaker section configured to provide sound information to surroundings, wherein
the operation section faces frontward,
the housing is open frontward,
an in-body space is defined by the casing, the image reading section, and the housing,
the recording medium having the image thereon is ejected from rear of the in-body space onto the exit tray,
the operation section is disposed in front of the image reading section,
the housing has a hollow space therein, the hollow space including a first region with a specific width extending frontward from a rear edge of the casing,
the housing has a front side on which the user operates the operation section and a rear side opposite to the front side, and
the speaker section is accommodated at a location closer to the front side than the rear side of the housing in the first region to face frontward.

2. The image forming apparatus according to claim 1, wherein
the housing has a substantially U-shape opening on the front side thereof and is disposed along an edge of the upper surface of the casing.

3. The image forming apparatus according to claim 2, wherein
the hollow space of the housing is divided into the first region, a second region, and a third region,
the first region is located opposite to the second region with the in-body space therebetween,
the second region has a specific width extending frontward from the rear edge of the casing, and
the third region has a specific width extending between the first and second regions along the rear edge of the casing.

4. The image forming apparatus according to claim 3, further comprising a fax board, wherein
the speaker section emits sound indicating that the fax board is performing communication with an external device, and
the fax board is disposed in the third region.

5. The image forming apparatus according to claim 1, wherein
the speaker section includes a speaker that emits sound to surroundings and a support that supports the speaker,
the support includes a tubular support main body, and
the speaker is accommodated in the support main body.

6. The image forming apparatus according to claim 5, wherein
the support further includes a flange protruding from an inner surface of the support main body, and
the speaker section further includes a pressing member pressing the speaker against the flange.

7. The image forming apparatus according to claim 1, wherein
   the speaker section is attachable to and detachable from the housing.

8. The image forming apparatus according to claim 1, wherein
   the speaker section is accommodated in proximity to the in-body space with a wall of the housing therebetween.

9. The image forming apparatus according to claim 1, wherein
   the speaker section is accommodated in proximity to a wall of the housing located on the one side of the housing.

10. The image forming apparatus according to claim 1, wherein
   the speaker section is fixed to the housing with a fixing member.

* * * * *